(12) United States Patent
Park et al.

(10) Patent No.: US 11,780,724 B2
(45) Date of Patent: Oct. 10, 2023

(54) LIQUID DISPENSER

(71) Applicant: LG ELECTRONICS INC., Seoul (KR)

(72) Inventors: Jongwoo Park, Seoul (KR); Ji Sun Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/578,935

(22) Filed: Jan. 19, 2022

(65) Prior Publication Data

US 2022/0227617 A1 Jul. 21, 2022

(30) Foreign Application Priority Data

Jan. 21, 2021 (KR) .................. 10-2021-0008892

(51) Int. Cl.
*B67D 1/12* (2006.01)
*B67D 1/00* (2006.01)
*C02F 1/00* (2023.01)

(52) U.S. Cl.
CPC .... *B67D 1/1277* (2013.01); *B67D 2001/0095* (2013.01); *C02F 1/001* (2013.01); *C02F 2201/004* (2013.01); *C02F 2201/005* (2013.01)

(58) Field of Classification Search
CPC .... B67D 2001/0095; B67D 2210/0001; B67D 2210/00047; B67D 2210/00062; B67D 1/12; C02F 1/001; C02F 2307/10
See application file for complete search history.

(56) References Cited

U.S. PATENT DOCUMENTS

| | | | | |
|---|---|---|---|---|
| 7,066,359 B2* | 6/2006 | Greiner-Perth | ..... | B05B 11/1039 222/321.2 |
| 8,056,770 B2* | 11/2011 | Lompech | ............ | B05B 11/1008 222/321.2 |
| 2008/0110936 A1* | 5/2008 | Ophardt | ................ | B05B 11/106 222/321.8 |
| 2022/0227617 A1* | 7/2022 | Park | ...................... | B67D 1/1277 |

FOREIGN PATENT DOCUMENTS

| | | | | |
|---|---|---|---|---|
| DE | 19951011 A1 * | 5/2001 | ........... | A47K 5/1205 |
| EP | 1982951 A1 * | 10/2008 | ........... | B67D 1/0412 |
| JP | 2011-518015 | 6/2011 | | |
| KR | 20090004335 A * | 1/2009 | ............ | B01D 35/04 |
| KR | 10-2014-0034519 | 3/2014 | | |
| KR | 10-2017-0034376 | 3/2017 | | |

(Continued)

OTHER PUBLICATIONS

Korean Office Action dated Sep. 21, 2022 issued in Application No. 10-2021-0008892.

*Primary Examiner* — Bob Zadeh
(74) *Attorney, Agent, or Firm* — KED & ASSOCIATES, LLP (57) ABSTRACT

A liquid dispenser, such as a water purifier, in one embodiment includes a water discharger connector provided with a water discharge valve configured to control discharge of purified water and a water discharge pipe connected to the water discharge valve, and a water discharger coupled to an upper side of the water discharger connector, and provided with a connector part that connects to the water discharge pipe based on fitted-coupling.

18 Claims, 8 Drawing Sheets

(56) References Cited

FOREIGN PATENT DOCUMENTS

| KR | 10-1828260 | 2/2018 |
| KR | 10-1926095 | 12/2018 |
| KR | 10-2019-0087966 | 7/2019 |
| KR | 10-2020-0013021 | 2/2020 |
| KR | 10-2020-0124132 | 11/2020 |

* cited by examiner

FIG. 8

LIQUID DISPENSER

CROSS-REFERENCE TO RELATED APPLICATION

This application claims priority to and the benefit of Korean Patent Application No. 10-2021-0008892, filed in Korea on Jan. 21, 2021, the disclosure of which is incorporated herein by reference in its entirety.

BACKGROUND

1. Field

Disclosed herein is a liquid dispenser, such as a water purifier, and specifically, a water purifier that ensures ease of a connection and disconnection of a water discharger.

2. Background

Water purifiers are a type of liquid dispensing devices that filter water and remove impurities included in the water, and used by households and businesses and the like. A water purifier used by most households connects to a water tap and removes suspended solids or harmful substances and the like contained in tap water with a filter, and based on a user's manipulation, purifies and discharges a desired amount of water. The water purifier discharges cool water and hot water as well as purified water, and is provided with a control valve respectively for discharging cool water, hot water and purified water.

A water discharger of the water purifier can separate from a main body of the water purifier or be integrated with the main body of the water purifier. However, costs and time spent connecting a tube of a connection pipe of the water discharger to a tube of the main body and disconnecting the tube of the connection pipe of the water discharger from the tube of the main body increase.

As a related art, a water purifier and a control method thereof are disclosed in Korean Patent Publication No. 10-2020-0013021 (published on Feb. 5, 2020).

BRIEF DESCRIPTION OF THE DRAWINGS

Embodiments will be described in detail with reference to the following drawings in which like reference numerals refer to like elements, and wherein.

DETAILED DESCRIPTION

In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 1:
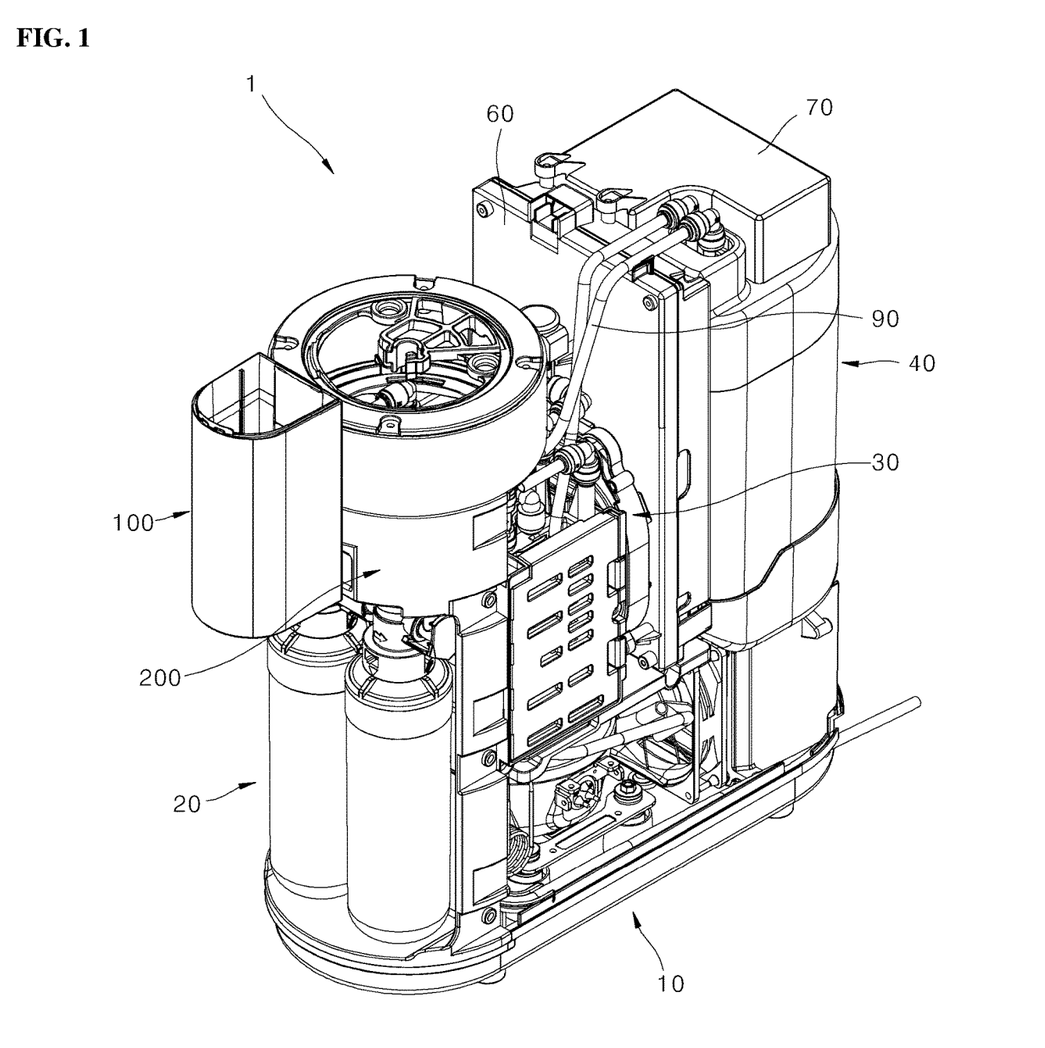
FIG. 1 is a perspective view showing a water purifier in one embodiment.
Figure 2:
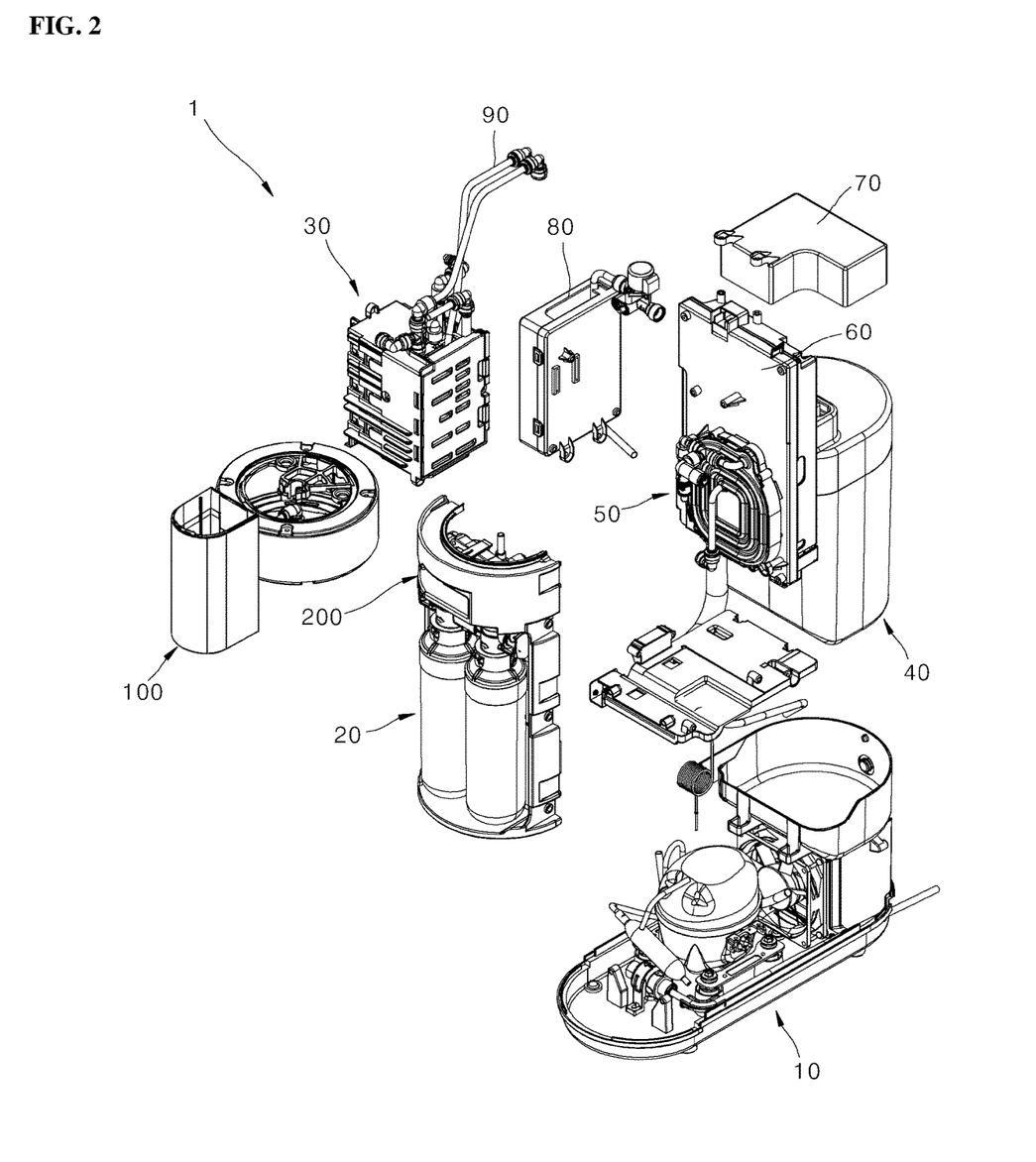
FIG. 2 is an exploded perspective view showing the water purifier in one embodiment.

FIG. 1 is a perspective view showing a water purifier (or liquid dispenser) 1 in one embodiment, and FIG. 2 is an exploded perspective view showing the water purifier 1 in one embodiment. As illustrated in FIGS. 1 and 2, the water purifier 1 in one embodiment may include at least one of a base tray (or base) 10, a filter 20, a direct water supply module 30, a cool water module (or cooler) 40, a hot water module (or heater) 50, a first controller 60, a second controller 70, a third controller 80, a water discharger (or liquid discharger) 100, and a water discharger connector (or liquid discharger connector) 200. The water purifier 1 in one embodiment provides a path connecting structure in which a water discharge pipe (or liquid discharge pipe) 230 automatically connects to a connector part (or coupling) 150 when the water discharger 100 connects to the water discharger connector 200 (see FIG. 3).

The base tray 10 forms a lower portion of the water purifier 1, and electronic components may be disposed at an upper side of the base tray 10. The filter 20 configured to purify water, the cool water module 40 configured to cool purified water, and the hot water module 50 configured to heat purified water are disposed at the upper side of the base tray 10.

The direct water supply module is disposed between the filter 20 and the cool water module 40, and controls a direction of movement of water. The hot water module 50 configured to heat water is disposed near the direct water supply module. The direct water supply module 30 connects to the cool water module 40, the hot water module 50, the water discharger connector 200 and the like through an inner tube 90.

Additionally, the first controller 60, the second controller 70 and the third controller 80 are disposed at the upper side of the base tray 10 to control valves and the like installed inside the cool water module 40, the hot water module 50 and the direct water supply module 30, thereby controlling operation of the water purifier 1. The number of the controllers may increase or decrease. For example, the first controller 60, the second controller 70, and the third controller 80 may be combined into a single component or printed circuit board.

The water discharger connector 200 provided with a water discharge valve (or liquid discharge valve) 220 is disposed at an upper side of the filter 20. The water discharger 100 is rotatably supported by an upper side of the water discharger connector 200. Through the water discharger 100, various liquids such as cool water, purified water, hot water and the like are discharged. The water purifier 1 without an outer case is illustrated in FIG. 1. The outer case is a component that is wide known. Accordingly, detailed description in relation to this is omitted.

In the water purifier 1, configured as described above, according to the disclosure, paths of the water discharger 100 and the water discharger connector 200 automatically connect only by mounting the water discharger 100 onto the water discharger connector 200, thereby prevent leakage of the connected portion, ensuring ease of assembly, maintenance and repairs.

Further, in the water purifier 1 in which the water discharger 100 is rotatable, water discharge paths automatically connect when the rotating water discharger 100 is coupled to the water discharger connector 200. Since the water discharge valve 220 is directly coupled to the water discharge pipe 230 without a connecting component, the water purifier 1 can have a compact size, and the number of components can decrease, resulting in a reduction in the costs incurred for raw materials.

Figure 3:
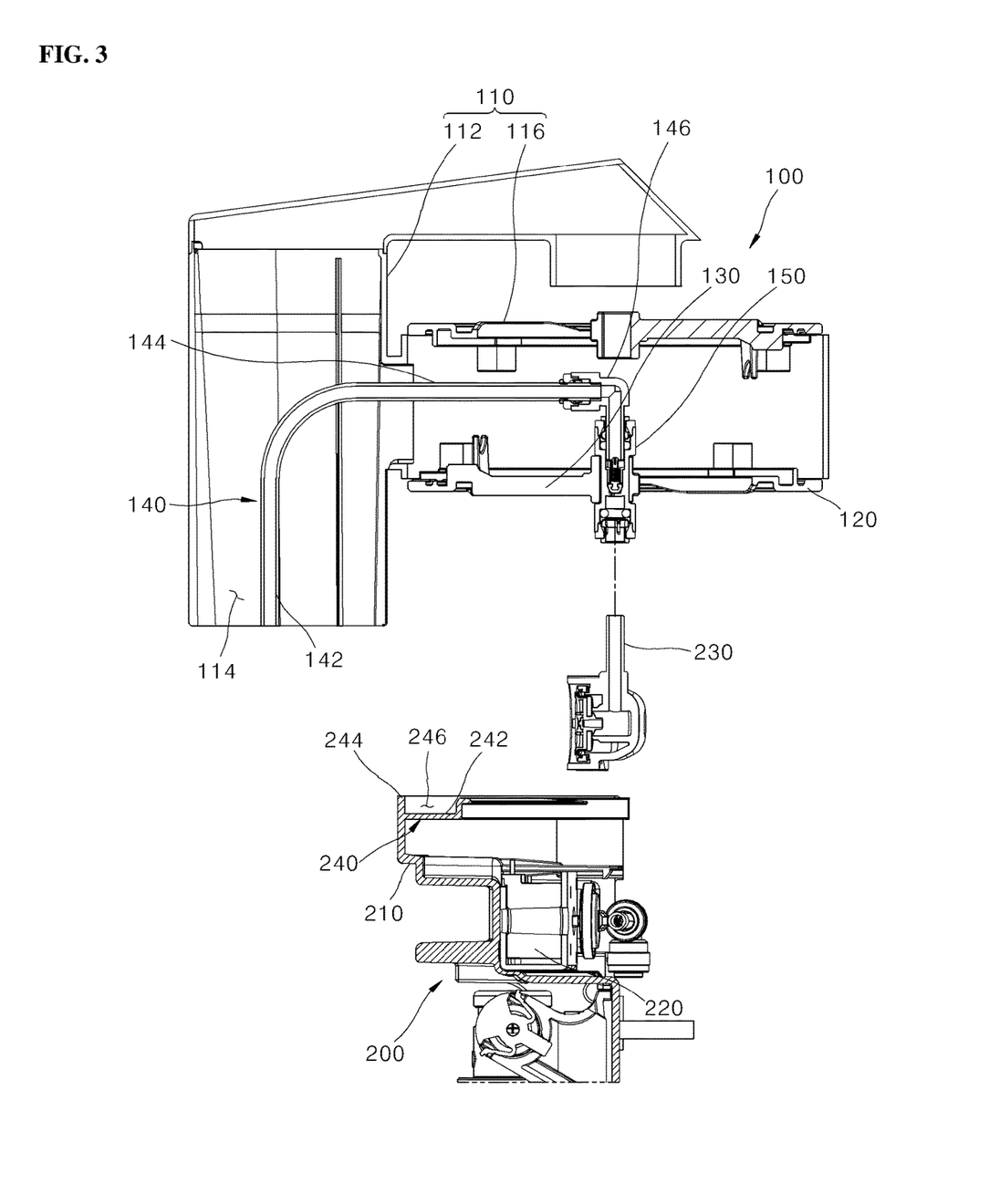
FIG. 3 is a cross-sectional view showing a water discharger separated from a water discharger connector in one embodiment.
Figure 4:
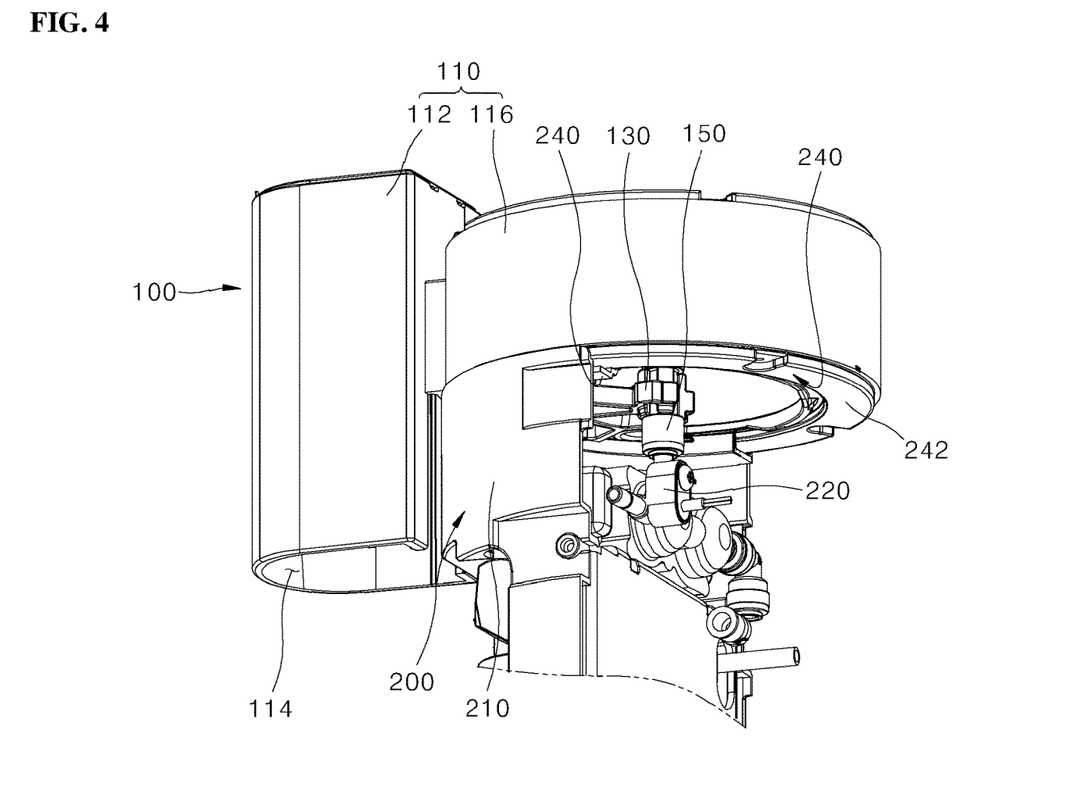
FIG. 4 is a perspective view showing the water discharger coupled to the water discharger connector in one embodiment.
Figure 5:
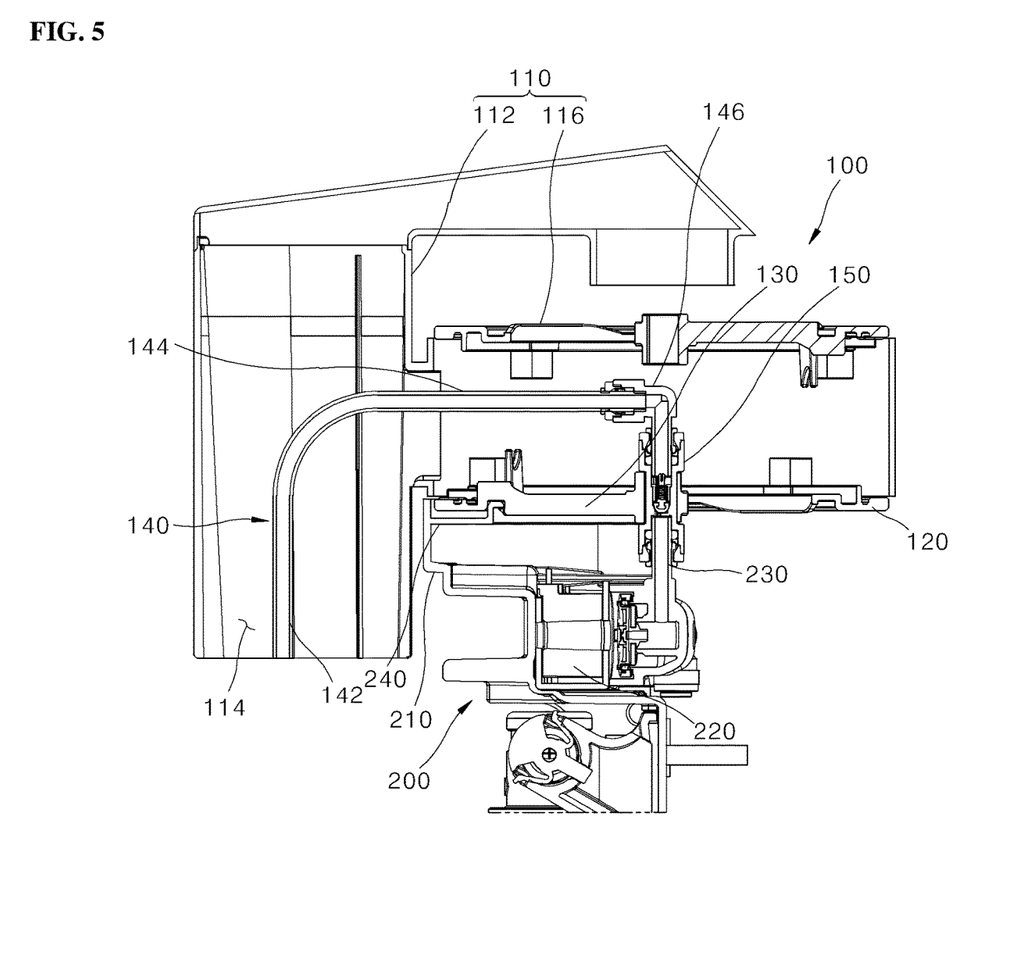
FIG. 5 is a cross-sectional view showing the water discharger coupled to the water discharger connector in one embodiment.

FIG. 3 is a cross-sectional view showing a water discharger 100 separated from a water discharger connector 200 in one embodiment, FIG. 4 is a perspective view showing the water discharger 100 coupled to the water discharger connector 200 in one embodiment, and FIG. 5 is a cross-sectional view showing the water discharger 100 coupled to the water discharger connector 200 in one embodiment.

As illustrated in FIGS. 3 to 5, the water discharger 100 in one embodiment may include a water discharger body part (or liquid discharger body) 110, a rotation guide rail part 120, a fixed bracket part 130, a water discharger tube part (or liquid discharger tube) 140 and a connector part (or coupling) 150.

As the water discharger 100 is mounted onto the water discharger connector 200, the water discharge pipe (or liquid discharge pipe) 230 connects to the connector part 150. As the water discharger 100 rotatably disposed at the water discharger connector 200 moves to upper and lower sides of the water discharger connector 200, to be mounted onto the water discharger connector 200, the water discharge pipe 230 is inserted into a lower side of the connector part 150 such that the water discharge pipe 230 automatically connects to the connector part 150.

The water discharger 100 may be implemented in various different forms within the technical scope in which the water discharger 100 is coupled to the upper side of the water discharger connector 200 and provided with the connector part 150 connected to the water discharge pipe 230 based on fitted-coupling. Additionally, the water discharger 100 may be rotatably disposed at the water discharger connector 200.

The water discharger body part 110 may be implemented in various different forms within the technical scope in which the water discharger body part 110 is disposed at the upper side of the water discharger connector 200. The water discharger body part 110 in one embodiment may include a first body 112 extended vertically and having a hollow part (or cavity) 114 therein, and a second body 116 extended from the first body 112 and disposed at the upper side of the water discharger connector 200.

While the second body 116 extends along a circumferential shape, the rotation guide rail part (or rotation guide rail) 120 connects to a lower side of the second body 116. The water discharger tube part 140 is installed inside the first body 112 and the second body 116.

The rotation guide rail part 120 may be implemented in various different forms within the technical scope in which the rotation guide rail part 120 is disposed a lower side of the water discharger 100 facing the water discharger connector 200 and mounted onto a fixed guide rail part (or fixed guide rail) 240. The rotation guide rail part 120 connected to a lower side of the water discharger body part 110 may be mounted onto the fixed guide rail part 240 disposed at the water discharger connector 200 and rotate along a circumferential direction. To this end, the rotation guide rail part 120 may extend at the lower side of the water discharger body part 110 along the circumferential direction and be mounted onto a guide groove 246 with which the fixed guide rail part 240 is provided. The rotation guide rail part 120 extends along a ring shape and protrudes downward to sit inside the fixed guide rail part 240.

The fixed bracket part (or fixed bracket) 130 may be implemented in various different forms within the technical scope in which the fixed bracket part 130 extends to an inside of the rotation guide rail part 120 and limits movement of the connector part 150. The connector part 150 connects to the water discharger tube part 140, and its movement is limited by the fixed bracket part 130. The fixed bracket part 130 in one embodiment includes an extension bracket 132, a first bracket 134, and a second bracket 138 (see FIG. 6).

The extension bracket 132 extends from the rotation guide rail part 120 to the connector part 150. The connector part 150 is disposed at a rotation center of the water discharger 100, and the extension bracket 132 extended from the water discharger body part 110 or the rotation guide rail part 120 forms a bracket extended toward the connector part 150.

The first bracket 134 connects to the extension bracket 132 and is disposed along a circumference of the connector part 150. Additionally, both ends of the first bracket 134 are spaced to form a mounting inlet 136 (see FIG. 6). The first bracket 134 extends along the circumference of the connector part 150 and connects to the extension bracket 132. Since both of the ends of the first bracket 134 are spaced to form the mounting inlet 136, the connector part 150 may move in and out of the first bracket 134 through the mounting inlet 136.

The second bracket 138 may be implemented in various different forms within the technical scope in which the second bracket 138 extends from the first bracket 134, and is inserted into a mounting groove 154 provided outside the connector part 150 and limits movement of the connector part 150. The second bracket 138 is disposed between the first bracket 134 and the connector part 150, extends vertically, and contacts a lateral surface of the connector part 150. A plurality of second brackets 138 is provided along the circumference the connector part 150. Since the second bracket 138 is inserted onto the mounting groove 154 provided outside the connector part 150, the second bracket 138 may limit movement of the connector part 150.

The connector part 150, connected to the water discharger tube part 140 and connected to or disconnected from the water discharge pipe 230 by moving vertically, is installed in a state of being fixed to the rotation center of the water discharger 100. The first bracket 134 and the second bracket 138 may be injection-molded, have elasticity and bend to some degree. Accordingly, the connector part 150 is disposed inside the second bracket 138 through the mounting inlet 136, and its movement is limited by a press of the second bracket 138.

The water discharger connector 200 is provided with the water discharge valve (or liquid discharge valve) 220, and the water discharge pipe 230, connected to the water discharge valve 220 and extended upward, is inserted into the lower side of the connector part 150. Since the water discharge pipe 230 and the connector part 150 are disposed at the rotation center of the water discharger 100, the rotation center of the water discharger 100 is the same as positions of the water discharge pipe 230 or the connector part 150.

One side of the water discharger tube part 140 may connect to the connector part 150, and the other side of the water discharger tube part 140 may extend out of the water discharger body part 110 through the inside of the water discharger body part 110 or be disposed inside the water discharger body part 110. The water discharger tube part 140 in one embodiment may include a first tube 142 disposed inside the first body 112, a second tube 144 disposed inside the second body 116, and a connection tube 146 connecting the second tube 144 and the connector part 150.

The first tube 142 and the second tube 144 may be integrated and guide discharge of water. Additionally, the connection tube 146 is a tube bent in a "¬" shape, and connects an end of the second tube 144 and the connector part 150 and guides movement of water.

Figure 6:
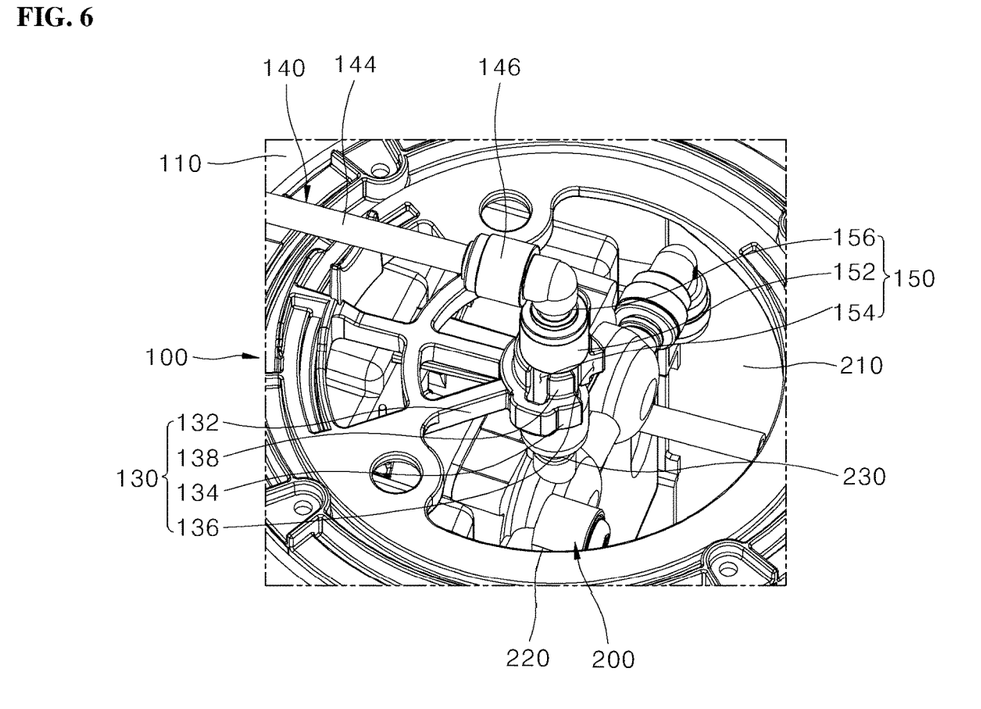
FIG. 6 is a perspective view showing a water discharge pipe connected to a connector part in one embodiment.
Figure 7:
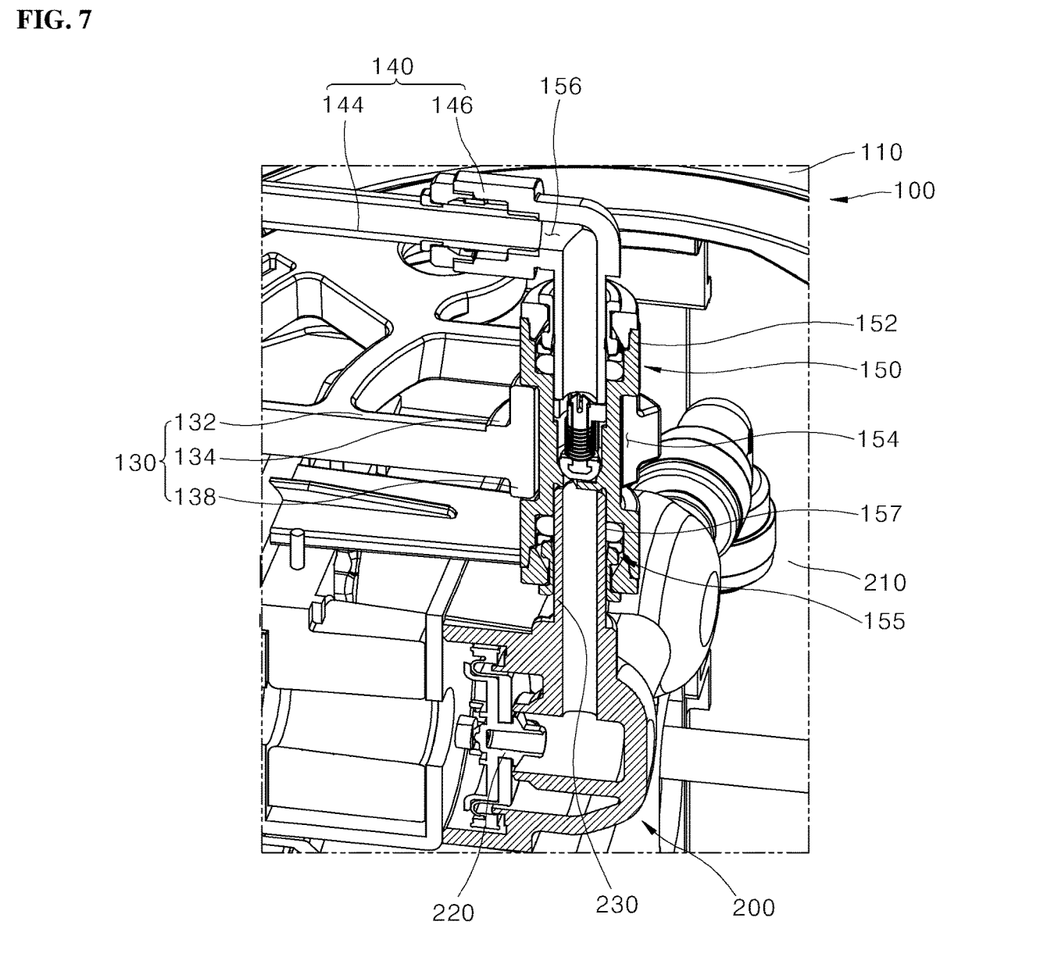
FIG. 7 is a partially cut perspective view showing the water discharge pipe connected to the connector part in one embodiment.
Figure 8:
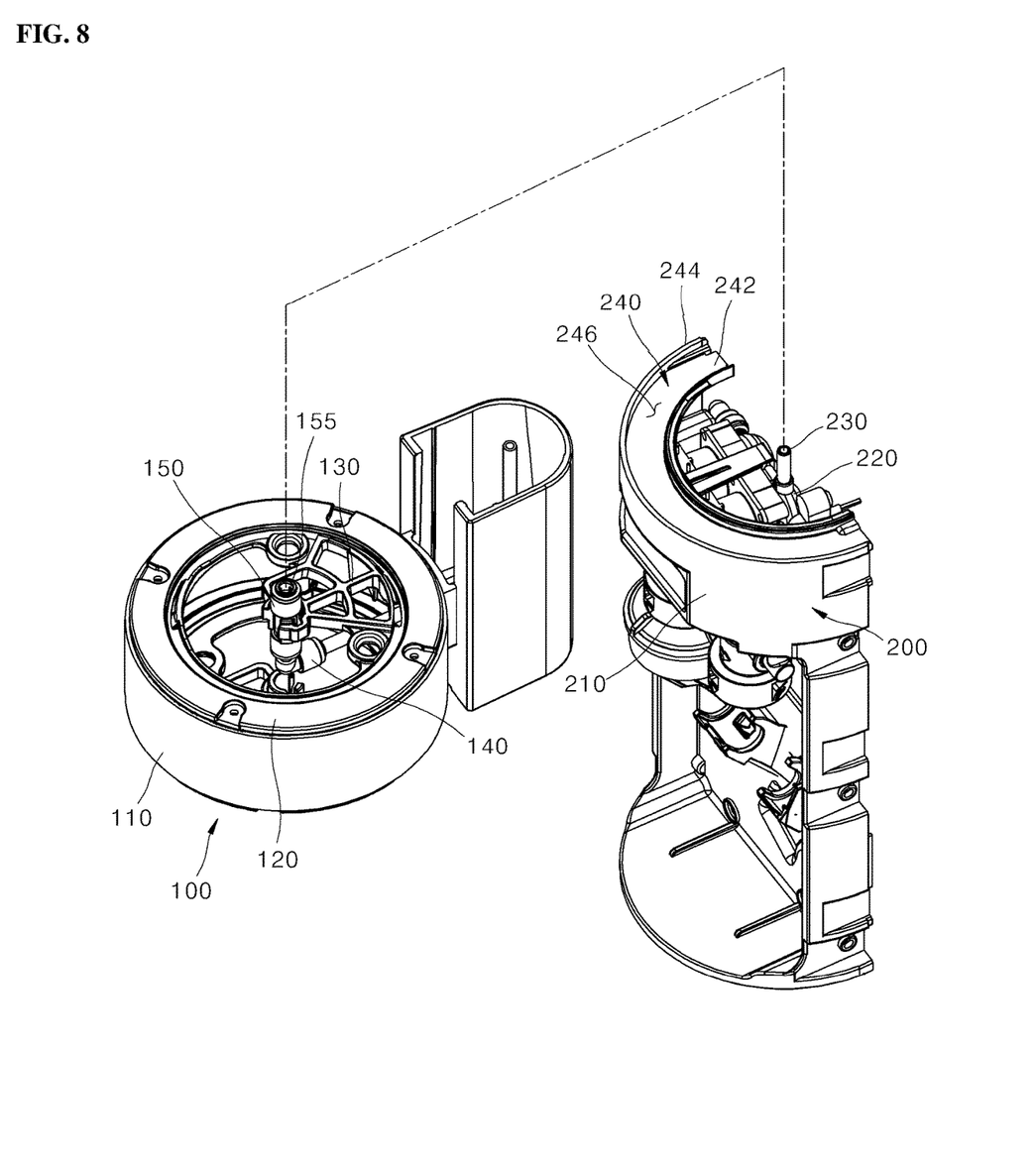
FIG. 8 is a perspective view showing the water discharger and the water discharger connector in one embodiment.

FIG. 6 is a perspective view showing a water discharge pipe 230 connected to a connector part 150 in one embodiment, FIG. 7 is a partially cut perspective view showing the water discharge pipe 230 connected to the connector part 150 in one embodiment, and FIG. 8 is a perspective view showing the water discharger 100 and the water discharger connector 200 in one embodiment. As illustrated in FIGS. 6 to 8, the connector part 150 may be implemented in various different forms within the technical scope in which the connector part 150 connects the water discharger tube part 140 and the water discharge pipe 230. The connector part 150 is disposed at an upper side of the water discharge pipe 230, and connected to the water discharge pipe 230 based on fitted-coupling.

The connector part 150 connected to the water discharge pipe 230 has no additional wedge structure for limiting a vertical movement of the water discharge pipe 230, therein. Accordingly, the water discharge pipe 230 and the connector part 150 may be coupled or separated only by assembling and disassembling the water discharger 100. The connector part 150 in one embodiment may include a connector body 152, a first connection groove (or first connection opening) 155, a second connection groove (or second connection opening) 156, and a sealing member (or seal) 157.

The connector body 152 is disposed at the rotation center of the water discharger 100 and extends vertically. The connector body 152 has an approximate cylinder shape, and a path through which purified water moves is formed vertically inside the connector body 152.

The first connection groove 155 forms a groove for inserting the water discharge pipe 230, at a lower side of the connector body 152. Accordingly, the water discharge pipe 230 is inserted into the lower side of the connector body 152 through the first connection groove 155.

The second connection groove 156 forms a groove into which the water discharger tube part 140 forming a water discharge path is inserted, at an upper side of the connector body 152. Since the first connection groove 155 and the second connection groove 156 communicate vertically, a liquid such as purified water, moving upward through the water discharge pipe 230, is delivered to the water discharger tube part 140 through the connector part 150.

The sealing member 157 is disposed near the water discharger tube part 140 inserted into the connector part 150 and near the water discharge pipe 230. The installation of the sealing member 157 leads to prevention of leakage of water out of the water discharger tube part 140 and the water discharge pipe 230.

The water discharger connector 200 may be implemented in various different forms within the technical scope in which the water discharger connector 200 is provided with the water discharge valve 220 configured to control discharge of purified water, and the water discharge pipe 230 connected to the water discharge valve 220. The water discharger connector 200 in one embodiment may include a water discharger connector body (or liquid discharger connector body) 210, a water discharge valve (or liquid discharge valve) 220, a water discharge pipe (or liquid discharge part) 230, a fixed guide rail part (or fixed guide rail) 240.

The water discharger connector body 210 supports the water discharge valve 220, and is disposed at the upper side of the filter 20 in a state in which movement of the water discharger connector body 210 is limited. The water discharger connector body 210 is disposed at the lower side of the second body 116 and limits movement of the water discharge valve 220.

The water discharge valve 220 is a valve that controls discharge of purified water. A connector such as a hook or a screw may be used to fix the water discharge valve 220 to the water discharger connector body 210, and a gap may be formed between the water discharge valve 220 and the water discharger connector body 210 to prevent leakage caused by errors in the coupling portion of the rotating water discharger 100.

The water discharge pipe 230 is disposed at the rotation center of the water discharger 100 and extends perpendicularly. A rigid pipe is used as the water discharge pipe 230 rather than a soft pipe. As the water discharger 100 is mounted onto the upper side of the water discharger connector 200 while moving from the upper side of the water discharger connector 200 to the lower side thereof, the water discharge pipe 230 and the connector part 150 connect.

The fixed guide rail part 240 connects to an upper side of the water discharger connector body 210 and forms the guide groove 246 along the circumferential direction. Accordingly, the fixed guide rail part 240 may be implemented in various different forms within the technical scope in which the fixed guide rail part supports the rotation guide rail part 120 of the water discharger 100 rotatably. The fixed guide rail part 240 in one embodiment includes a base rail 242 and a side member 244 (or side wall).

The base rail 242 is disposed at a lower side to face the water discharger 100, and extends along the circumferential direction, to form a lower surface of the guide groove 246. The base rail 242 forms a flat surface along the circumferential direction, and the rotation guide rail part 120 is mounted onto the base rail 242 while contacting the base rail 242.

Since the side member 244 forms a wall that protrudes upward from both sides of the base rail 242 and prevents the rotation guide rail part 120 mounted onto the guide groove 246 from escaping. A longitudinal cross section of the fixed guide rail part 240 has a "⊏" or U-shape that is open upward, and the guide groove 246 is formed by the base rail 242 and the side member 244.

As the water discharger 100 is mounted onto the upper side of the water discharger connector 200 while moving from the upper side of the water discharger connector 200 to the lower side thereof, the water discharge pipe 230 and the connector part 150 connect. The rotation guide rail part 120 of the water discharger 100 is mounted onto the fixed guide rail part 240 of the water discharger connector 200. As the water discharger 100 moves downward, the water discharge pipe 230 is inserted into the first connection groove 155 of the connector part 150.

Only by connection the water discharger 100 to the water discharger connector 200, the water discharge pipe 230 and the water discharger tube part 140 are connected by the connector part 150, thereby reducing the risk of leakage in the coupling portion and ensuring ease of assembly and management. Additionally, the water discharge valve 220 directly connects to the water discharge pipe without a connecting component, thereby making a product compact and reducing costs incurred for raw materials.

Further, when the water discharger 100 moves to the upper side of the water discharger connector 200 and separates from the water discharger connector 200, the water discharge pipe 230 automatically separates from the connector part 150. Accordingly, additional work for separating the paths is not required. Furthermore, since the connector part 150 and the water discharge pipe 230 have a rigid body, the paths automatically separate only by separating the water discharger 100 from the water discharger connector 200.

An aspect of the present disclosure provides a water purifier that ensures ease of a connection and disconnection of a water discharger. Also, as aspect of the present disclosure provides a water purifier that ensures simplicity in the installation structure of the water discharger, reducing manufacturing costs incurred for the product and making the product compact.

Aspects according to the present disclosure are not limited to the above ones, and other aspects and advantages that are not mentioned above can be clearly understood from the foregoing description and can be more clearly understood from the embodiments set forth herein. Additionally, the aspects in the present disclosure can be realized via means and combinations thereof that are described in the appended claims.

To achieve the above aspects, a water purifier according to the disclosure allows of a connection between a water discharge pipe and a connector part as a water discharger is mounted onto a water discharger connector. Specifically, as the water discharger rotatably disposed at the water discharger connector moves perpendicularly and is mounted onto the water discharger connector, the water discharge pipe is inserted into a lower side of the connector part, and the water discharge pipe and the connector part connect.

A liquid dispenser, such as a water purifier, in on embodiment may include a water discharger connector provided with a water discharge valve configured to control discharge of purified water and a water discharge pipe connected to the water discharge valve, and a water discharger coupled to an upper side of the water discharger connector and provided with a connector part that connects to the water discharge pipe based on fitted-coupling, and as the water discharger is mounted onto the upper side of the water discharger connector while moving from the upper side of the water discharger connector to a lower side thereof, the water discharge pipe and the connector part may connect.

The water discharger connector may include a water discharger connector body which supports the water discharge valve and movement of which is limited, and a fixed guide rail part connected to the upper side of the water discharger connector body and forming a guide groove along a circumferential direction. The fixed guide rail part may include a base rail disposed at a lower side to face the water discharger, extending along the circumferential direction and forming a lower surface of the guide groove, and a side member protruding upward from both sides of the base rail.

The water discharger may be rotatably disposed at the water discharger connector. The water discharge pipe may be disposed at a rotation center of the water discharger and extend perpendicularly. Additionally, the water discharger may include a water discharger body part disposed at the upper side of the water discharger connector, and a water discharger tube part one side of which connects to the connector part and the other side of which extends out of the water discharger body part through an inside of the water discharger body part.

Further, the water discharger may further include a rotation guide rail part connected to a lower side of the water discharger body part facing the water discharger connector and mounted onto a fixed guide rail part with which the water discharger connector is provided. The rotation guide rail part may extend from the lower side of the water discharger body part along the circumferential direction and sit in a guide groove with which the fixed guide rail part is provided.

The water discharger may further include a fixed bracket part extending to an inside of the rotation guide rail part and limiting movement of the connector part. The fixed bracket part may include an extension bracket extending from the rotation guide rail part to the connector part, a first bracket which is connected to the extension bracket and installed along a circumference of the connector part and both ends of which are spaced to form a mounting inlet, and a second bracket extending from the first bracket, inserted into a mounting groove disposed outside the connector part and limiting movement of the connector part.

The connector part may include a connector body disposed at a rotation center of the water discharger and extending vertically, a first connection groove forming a groove for inserting the water discharge pipe at a lower side of the connector body, and a second connection groove into which a water discharger tube part is inserted, and the water discharger tube part forms a water discharge path at an upper side of the connector body. The first connection groove and the second connection groove may communicate.

A water purifier in one embodiment may include a water discharger connector provided with a water discharge valve configured to control discharge of purified water and a water discharge pipe connected to the water discharge valve, and a water discharger coupled to an upper side of the water discharger connector and provided with a connector part that connects to the water discharge pipe based on fitted-coupling. The water discharger connector may include a water discharger connector body which supports the water discharge valve and movement of which is limited, and a fixed guide rail part connected to the upper side of the water discharger connector body and forming a guide groove along a circumferential direction.

The water discharger may include a rotation guide rail part disposed at a lower side of the water discharger facing the water discharger connector and mounted onto the fixed guide rail part. The fixed guide rail part may include a base rail disposed at a lower side to face the water discharger, extending along the circumferential direction and forming a lower surface of the guide groove, and a side member protruding upward from both sides of the base rail.

The water discharge pipe may be disposed at a rotation center of the water discharger and extend perpendicularly. As the water discharger is mounted onto the upper side of the water discharger connector while moving from the upper side of the water discharger connector to a lower side thereof, the water discharge pipe and the connector part may connect.

Additionally, the water discharger may further include a fixed bracket part extending to an inside of the rotation guide rail part and limiting movement of the connector part. The fixed bracket part may include an extension bracket extending from the rotation guide rail part to the connector part, a first bracket which is connected to the extension bracket and installed along a circumference of the connector part and both ends of which are spaced to form a mounting inlet, and a second bracket extending from the first bracket, inserted into a mounting groove disposed outside the connector part and limiting movement of the connector part.

In a water purifier according to the present disclosure, a connector part and a water discharge pipe connect only by moving a water discharger vertically, thereby reducing the costs and time spent maintaining and repairing the water discharger. In the water purifier according to the present disclosure, the number of components required for connecting the water discharge pipe and the connector part decreases, thereby reducing manufacturing costs incurred for the product and making the product compact.

The embodiments are described above with reference to a number of illustrative embodiments thereof. However, embodiments are not limited to the embodiments and drawings set forth herein, and numerous other modifications and embodiments can be drawn by one skilled in the art without departing from the technical spirit of the disclosure. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
a liquid discharger connector including a liquid discharge valve configured to control discharge of a liquid, and a liquid discharge pipe connected to the liquid discharge valve; and
a liquid discharger coupled to an upper side of the liquid discharger connector, and including a connector coupling that is fitted to the liquid discharge pipe, wherein a coupling force is applied to the liquid discharge pipe and the connector coupling when the liquid discharger moves downward along the upper side of the liquid discharger connector,
where liquid discharge pipe is provided at a rotation center of the liquid discharger and extends perpendicularly from the rotation center of the liquid discharger.

2. The liquid dispenser of claim 1, wherein the liquid discharger connector includes:
a liquid discharger connector body which supports the liquid discharge valve and has a limited movement; and
a fixed guide rail connected to an upper side of the liquid discharger connector body, and forming a guide groove along a circumferential direction.

3. The liquid dispenser of claim 2, wherein the fixed guide rail includes:
 a base rail provided at a lower side of the fixed guide rail to face the liquid discharger, extending along the circumferential direction, and forming a lower surface of the guide groove; and
 side walls protruding upward from respective sides of the base rail.

4. The liquid dispenser of claim 1, wherein the liquid discharger is rotatably provided at the liquid discharger connector.

5. The liquid dispenser of claim 1, wherein the liquid discharger includes:
 a liquid discharger body positioned above the liquid discharger connector; and
 a liquid discharger tube, wherein one side of the liquid discharger tube connects to the connector coupling, and another side of liquid discharger tube extends out of the liquid discharger body through an interior of the liquid discharger body.

6. The liquid dispenser of claim 5, wherein the liquid discharger includes:
 a rotation guide rail that is connected to a lower side of the liquid discharger body facing the liquid discharger connector, and is mounted onto a fixed guide rail included in the liquid discharger connector.

7. The liquid dispenser of claim 6, wherein the rotation guide rail extends from a lower side of the liquid discharger body along a circumferential direction and sits in a guide groove included in the fixed guide rail.

8. The liquid dispenser of claim 6, the liquid discharger, further comprising:
 a fixed bracket extending to an inside of the rotation guide rail to limit a movement of the connector coupling.

9. The liquid dispenser of claim 8, wherein the fixed bracket includes:
 an extension bracket extending from the rotation guide rail to the connector coupling;
 a first bracket which is connected to the extension bracket and installed along a circumference of the connector coupling, ends of the first bracket being spaced apart to form a mounting inlet; and
 a second bracket extending from the first bracket, the second bracket being inserted into a mounting groove positioned outside the connector coupling to limit a movement of the connector coupling.

10. The liquid dispenser of claim 1, wherein the connector coupling includes:
 a connector body provided at a rotation center of the liquid discharger and extending vertically;
 a first connection groove forming a groove that receives the liquid discharge pipe at a lower side of the connector coupling; and
 a second connection groove into which a liquid discharger tube is inserted, wherein the liquid discharger tube forms a liquid discharge path at an upper side of the connector body.

11. The liquid dispenser of claim 10, wherein the first connection groove and the second connection groove communicate.

12. A liquid dispenser, comprising:
 a liquid discharger connector including a liquid discharge valve configured to control discharge of a liquid, and a liquid discharge pipe connected to the liquid discharge valve; and
 a liquid discharger coupled to the liquid discharger connector, and including a connector coupling that connects to the liquid discharge pipe,
 the liquid discharger connector including:
 a liquid discharger connector body which supports the liquid discharge valve and has a limited movement; and
 a fixed guide rail connected to an upper side of the liquid discharger connector body, and forming a guide groove along a circumferential direction.

13. The liquid dispenser of claim 12, wherein the liquid discharger includes:
 a rotation guide rail provided at a lower side of the liquid discharger facing the liquid discharger connector, and mounted onto the fixed guide rail.

14. The liquid dispenser of claim 12, wherein the fixed guide rail includes:
 a base rail provided at a lower side of the fixed guide rail to face the liquid discharger, extending along a circumferential direction, and forming a lower surface of the guide groove; and
 side walls protruding upward from respective sides of the base rail.

15. The liquid dispenser of claim 12, wherein the liquid discharge pipe is positioned at a rotation center of the liquid discharger and extends perpendicularly therefrom.

16. The liquid dispenser of claim 15, wherein the liquid discharger is mounted onto a side of the liquid discharger connector, and when the liquid discharger moves downward along the side of the liquid discharger connector, a coupling force is applied to the liquid discharge pipe and the connector coupling.

17. The liquid dispenser of claim 13, wherein the liquid discharger incudes:
 a fixed bracket extending to an inside of the rotation guide rail and limiting movement of the connector coupling.

18. The liquid dispenser of claim 17, wherein the fixed bracket includes:
 an extension bracket extending from the rotation guide rail to the connector coupling;
 a first bracket which is connected to the extension bracket and installed along a circumference of the connector coupling, ends of the first bracket being spaced apart to form a mounting inlet; and
 a second bracket extending from the first bracket, and inserted into a mounting groove outside of the connector coupling to limit a movement of the connector coupling.

* * * * *